United States Patent [19]

Forizs

[11] Patent Number: 4,537,372
[45] Date of Patent: Aug. 27, 1985

[54] VTOL AIRCRAFT

[76] Inventor: Lorant Forizs, 983 Sunrise Dr., Tarpon Springs, Fla. 33589

[21] Appl. No.: 492,233

[22] Filed: May 6, 1983

[51] Int. Cl.³ .................... B64C 27/20; B64C 29/00
[52] U.S. Cl. ...................................... 244/12.4; 244/66
[58] Field of Search ............... 244/4 R, 12.1, 12.2, 244/12.4, 17.23, 17.25, 23 R, 23 A, 23 B, 23 C, 66, 7 R, 56, 17.11, 34 A, 12.6, 100 R

[56] References Cited

U.S. PATENT DOCUMENTS

| | | | |
|---|---|---|---|
| 1,928,578 | 9/1933 | Turrell | 244/23 R |
| 2,961,189 | 11/1960 | Doak | 244/7 R |
| 3,061,242 | 10/1962 | Zurawinski | 244/23 A |
| 3,184,183 | 5/1965 | Piasecki | 244/23 B |
| 3,265,329 | 8/1966 | Postelson | 244/23 R |
| 3,360,217 | 12/1967 | Trotter | 244/12.4 |
| 4,037,807 | 7/1977 | Johnston et al. | 244/34 A |

OTHER PUBLICATIONS

"Mini Introduction to a New Technology", Karl Eickmann, Airmail Edition J, Hayama Japan, p. 61, 1978.

*Primary Examiner*—Trygve M. Blix
*Assistant Examiner*—Rodney Corl
*Attorney, Agent, or Firm*—Harvey B. Jacobson

[57] ABSTRACT

A fuselage is provided including front and rear ends, opposite side and top and bottom portions. A pair of laterally spaced front-to-rear extending elongated support structures are supported from opposite sides of the fuselage with the front and rear ends of the support structures extending forward and rearward of the fuselage. A pair of front and rear tubular wings are oscillatably supported between the front and rear ends of the support structures for angular displacement about axes extending between corresponding ends of the support structures and disposed generally along diametric planes of the tubular wings. The tubular wings include inlet and discharge ends and control structure is connected between the tubular wings and the support structures operative to simultaneously and equally angularly adjust the tubular wings relative to the support structures between upright positions with the inlet ends opening upwardly and horizontal positions with the inlet ends opening forwardly. Motor driven propeller structure is journalled in the wings for intaking air through the inlet ends and discharging air from the discharge ends.

9 Claims, 7 Drawing Figures

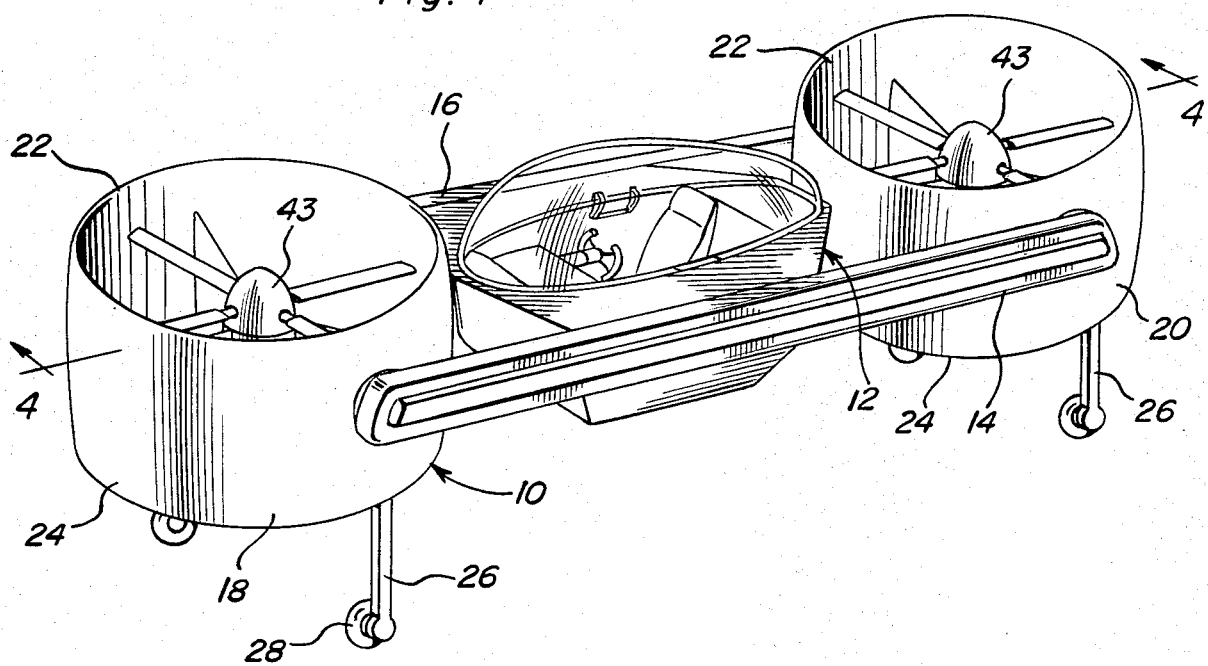
Fig. 1
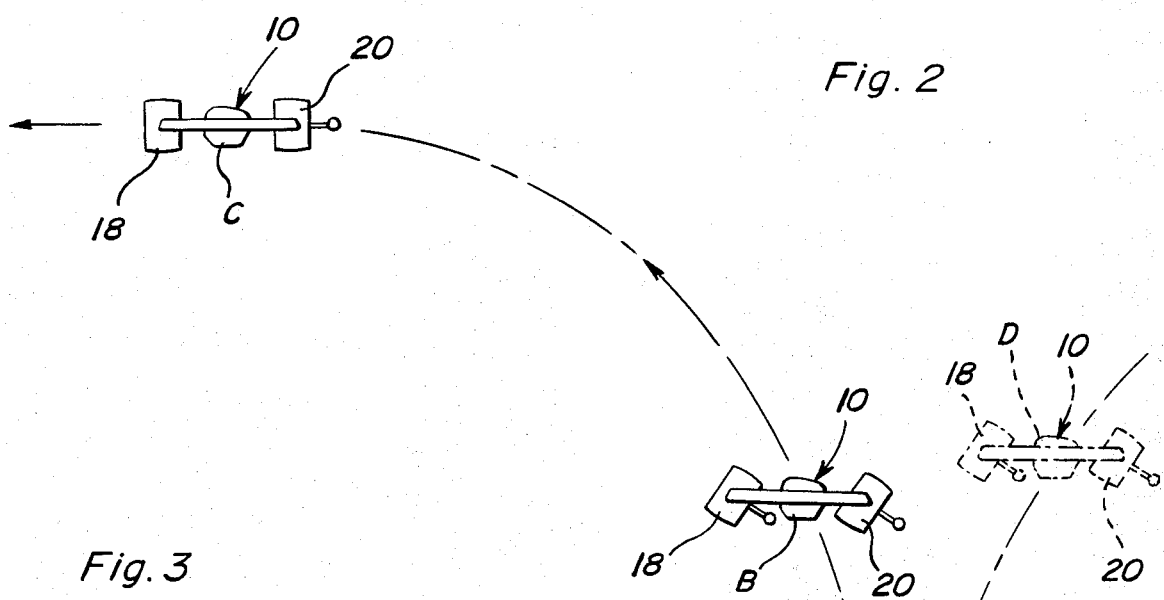
Fig. 2
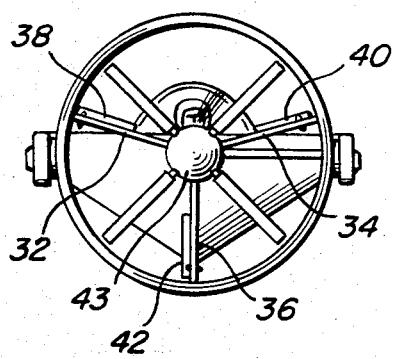
Fig. 3
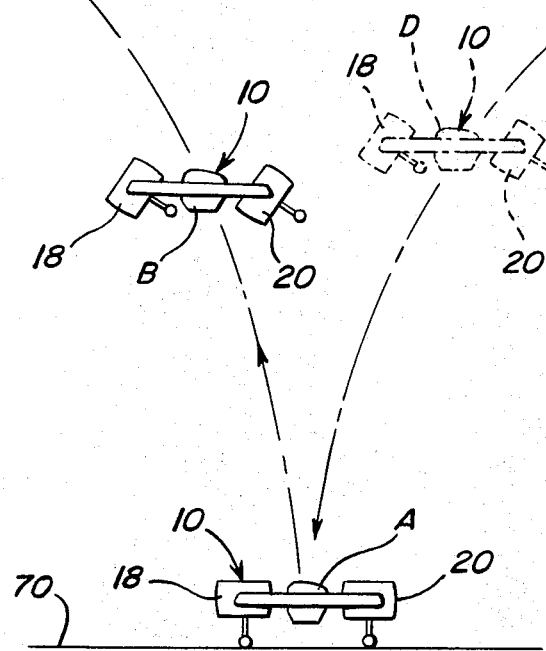

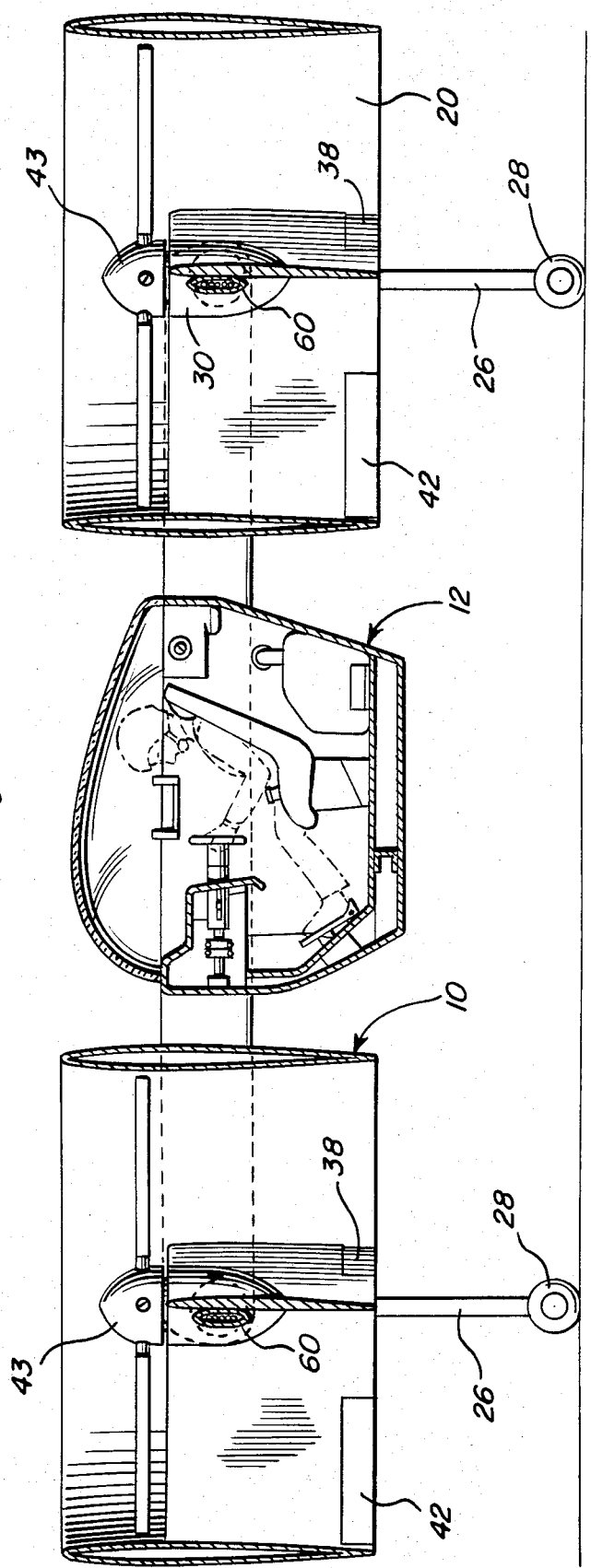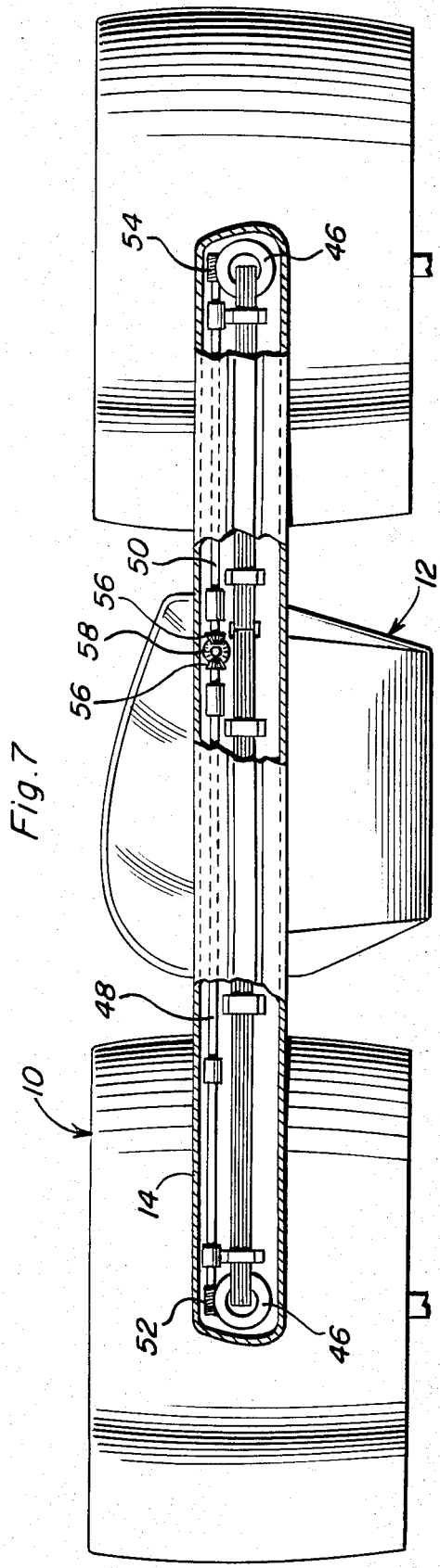

VTOL AIRCRAFT

BACKGROUND OF THE INVENTION

Various forms of aircraft capable of both horizontal and vertical movement heretofore have been provided and some of these aircraft also include the capacity to hover. However, most of these previously known forms of aircraft utilize design concepts and flight and maneuvering controls which are highly complex, expensive and require considerable maintenance. Accordingly, a need exists for an aircraft which is capable of both horizontal and vertical flight and also hovering and yet which will be of simple design and include easily controllable and non-complex flight controlling structures.

Examples of various previously known forms of aircraft including some of the general structural and operational features of the instant invention are disclosed in U.S. Pat. Nos. 2,868,476, 2,952,422, 2,961,189, 3,049,320, 3,350,035, 3,356,315 and 3,456,902.

BRIEF DESCRIPTION OF THE INVENTION

The aircraft of the instant invention includes a central fuselage having opposite side and front and rear portions with the opposite side portions supporting horizontally elongated support structures therefrom. The front and rear ends of the support structures extend forward and rearward of the fuselage and mount a pair of front and rear tubular wings therebetween for oscillation about axes extending between corresponding ends of the support structures and disposed generally on diametric planes of the tubular wings. Control structure is connected between the tubular wings and the support structures for simultaneously and equally angularly adjusting the tubular wings relative to the support structures between upright positions with the inlet ends of the tubular wings opening upwardly and horizontal positions with the inlet ends of the tubular wings opening forwardly. Motor driven propellers are journalled within the wings for intaking air through the inlet ends thereof and discharging air from the discharge ends thereof. Either the fuselage, support structures or outlet ends of the tubular wings may include landing gear structures for support of the aircraft from the ground and the propellers mounted in the tubular wings may be of the adjustable pitch type. In addition, when the tubular wings are in their upright positions the propellers are disposed in planes spaced appreciably above the center of gravity of the aircraft for stability of flight when the aircraft is rising vertically or hovering.

The motor driven propellers are supported from central supports mounted within the tubular wings and those central supports are supported within the tubular wings by generally radial strut assemblies, at least some of which may include movable control surfaces serving as rudders and elevators. Still further, if lateral stability is to be increased, additional side jets or propeller assemblies may be used.

The main object of this invention is to provide an aircraft capable of both vertical and horizontal flight, effective maneuverability while in horizontal flight and which will also be capable of slow speed or vertical take-off and landings.

Another object of this invention is to provide an aircraft in accordance with the preceding object and incorporating relatively simple power means and controls for effecting translation between vertical and horizontal flight.

Still another important object of this invention is to provide an aircraft which will utilize relatively simple controls and aerodynamic principles for conversion between vertical and horizontal flight.

Yet another object of this invention is to provide an aircraft having inherent operating stability characteristics.

A final object of this invention to be specifically enumerated herein is to provide an improved form of aircraft which will conform to conventional forms of manufacture, be of simple construction and easy to pilot so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the instant invention;

FIG. 2 is a schematic view illustrating the aircraft in several different positions and the manner in which substantially vertical landings and take-offs may be accomplished subsequent and prior to horizontal flight;

FIG. 3 is a front elevational view of the aircraft in its horizontal flight mode;

FIG. 4 is an enlarged longitudinal vertical sectional view taken substantially upon the plane indicated by the section line 4—4 of FIG. 1;

FIG. 7 is an enlarged side elevational view of the aircraft with portions of the near side front-to-rear extending support structure broken away and illustrated in vertical section.

DETAILED DESCRIPTION OF THE INVENTION

Figure 5:
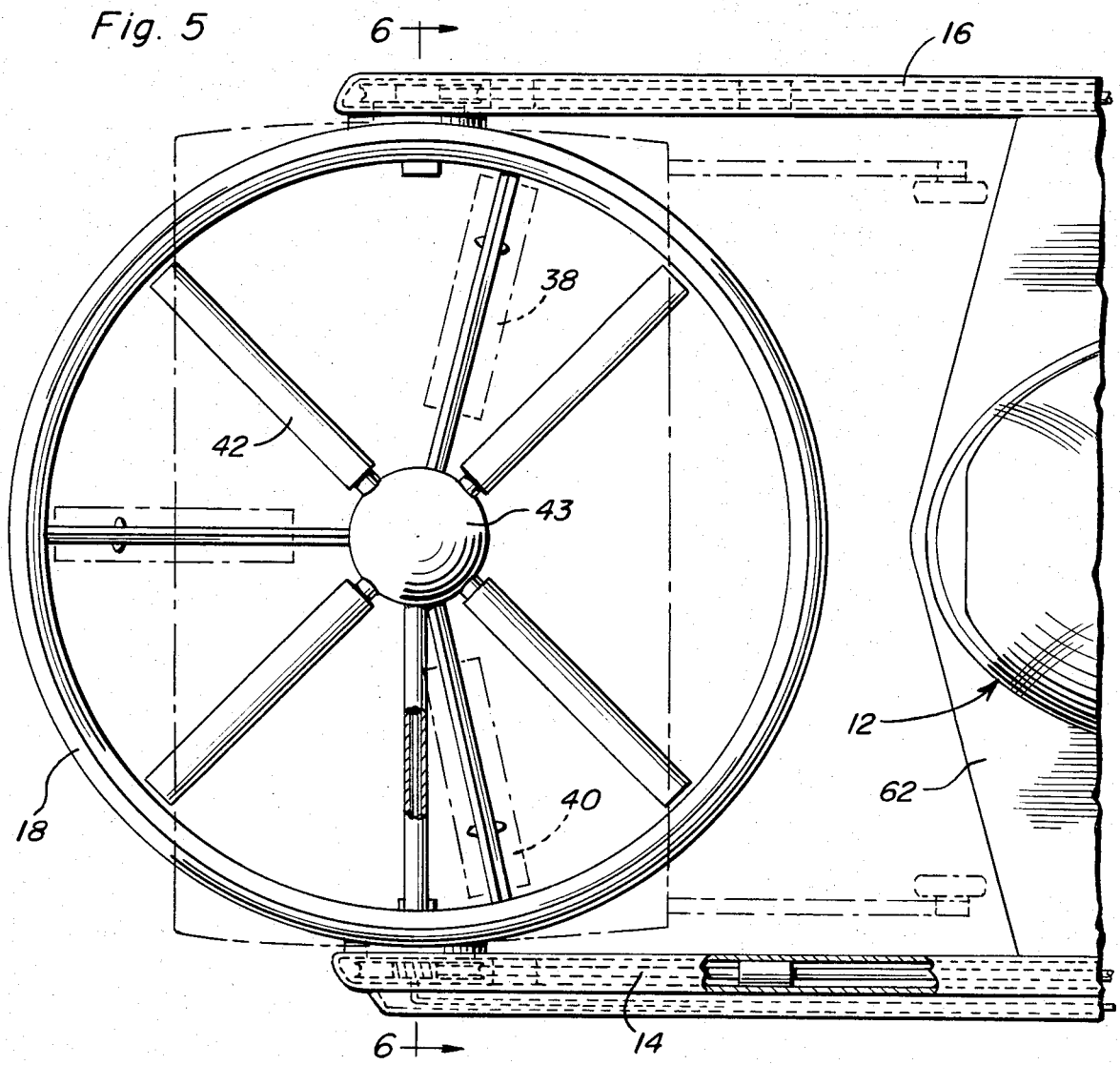
FIG. 5 is a fragmentary enlarged top plan view of the forward portion of the aircraft in a vertical flight mode.
Figure 6:
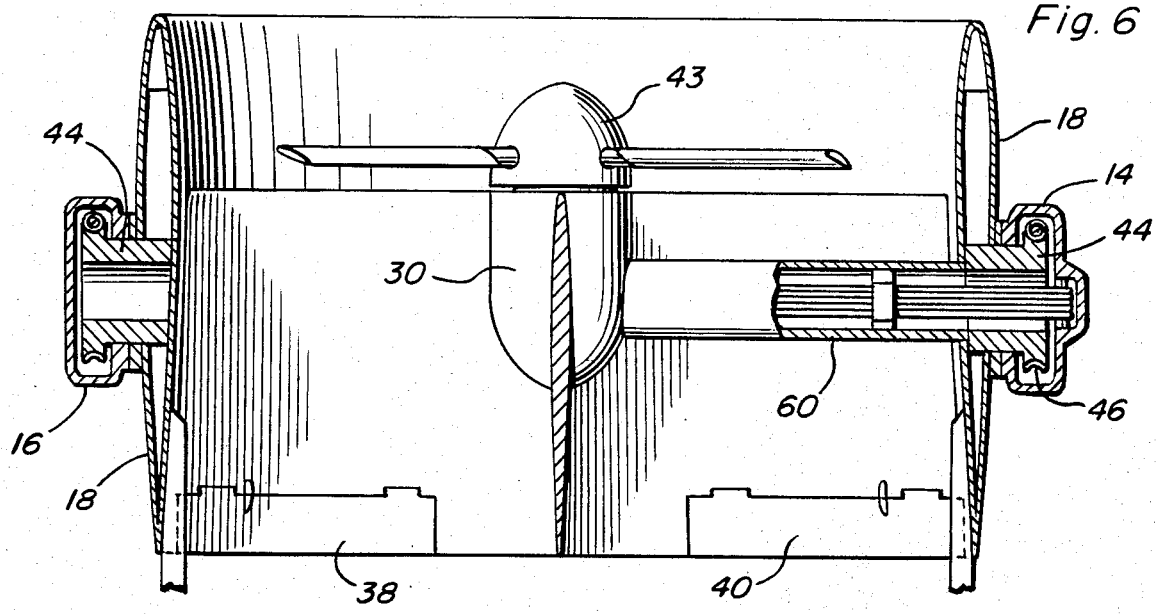
FIG. 6 is a vertical sectional view taken substantially upon the plane indicated by the section line 6—6 of FIG. 5.

Referring now more specifically to the drawings, the numeral 10 generally designates the aircraft of the instant invention. The aircraft 10 includes a central fuselage referred to in general by the reference numeral 12 and the fuselage includes front-to-rear extending horizontal opposite side support structures 14 and 16 supported therefrom. The front and rear ends of the support structures 14 and 16 project forwardly and rearwardly of the fuselage 12 and front and rear tubular wings 18 and 20 are oscillatably supported between the front and rear ends of the support structures 14 and 16 for angular displacement about axes extending generally along diametric planes of the tubular wings.

The tubular wings 18 and 20 each include inlet and outlet ends 22 and 24 and the outlet ends of the tubular wings include opposite side axially outwardly projecting landing gear struts 26 having landing wheels 28 journalled from their free ends. In addition, a motor housing 30 is centrally supported in each tubular wing 18 and 20 through the utilization of three substantially equally angularly displaced struts 32, 34 and 36. The struts 32 and 34 include movable combined elevators and ailerons 38 and 40 and each strut 36 includes a movable rudder 42. In addition, each motor housing 30 encloses a suitable motor equipped with a rotary output shaft on which a propeller assembly 43 is mounted forward of the respective struts 32, 34 and 36.

Diametrically opposite portions of each of the tubular wings 18 and 20 include diametrically opposite outwardly projecting stub axle portions 44 journalled from the corresponding ends of the support structures 14 and 16 and each of the stub axle portions 44 includes an outer worm wheel 46 formed thereon. Each of the support structures 14 and 16 rotatably journals a pair of front and rear aligned control shafts 48 and 50 and the remote ends of the control shafts 48 and 50 have worm gears 52 and 54 mounted thereon and meshed with the corresponding worm wheels 46. The adjacent ends of the control shafts 48 and 50 include bevel gears 56 mounted thereon meshed with a reversible motor driven gear wheel 58. In addition, those stub axle portions 44 journalled from the opposite ends of the support structure 14 include inwardly extending tubular portions 60 which extend between the stub axle portions 44 and the associated motor housings 30. Suitable engine operating controls and propeller blade feathering controls may extend from the interior of the support structure 14 through the tubular portions 60 and into the motor housings 30. Of course, the left side of the fuselage 12 is in communication with the interior of the central portion of the support structure 14 and the various controls for operation of the motors and controlling the pitch of the blades of the propeller assemblies 43 may pass from the fuselage 12 into the interior of the support structure 14. Further, the reversible motors for driving the gears 58 may be controlled from the fuselage 12.

The fuselage 12 is supported between the mid-portions of the support structures 14 and 16 through the utilization of an abbreviated wing structure 62 and the controls for the combined elevators and ailerons 38 and 40 and the rudders 42 may also pass from the fuselage 12 into the support structure 14 and from the opposite ends of the support structure 14 through the tubular portions 60 and into the housings 30.

The tubular wings 18 and 20 may be pivoted from the upstanding positions illustrated in FIG. 1 to the horizontal positions illustrated in the upper left hand portion of FIG. 2 and in this configuration the aircraft 10 has its tubular wings 18 and 20 disposed for horizontal flight. During horizontal flight the combined elevators and ailerons 38 and 40 supported in the rear tubular wing 20 may be used solely as elevators and the combined elevators and ailerons 38 and 40 in the forward tubular wing 18 may be used as ailerons. Accordingly, the control structures for the elements 38 and 40 may be operated independently for each of the tubular wings 18 and 20. Further, the rudders 42 each may be operated independently for orienting the aircraft 10 during hovering and vertical take-off and landings, or the rear elevator 42 may be operated independent of operation of the forward rudder 42 during horizontal flight.

From the foregoing it is deemed apparent that operation of the propeller assemblies 43 from the lower A position illustrated in FIG. 2 will cause the aircraft 10 to rise vertically from the ground 70 and subsequent tilting of the tubular wings 18 and 20 toward the horizontal positions will cause the aircraft 10 to move through the transitional position B illustrated in FIG. 2 between initial vertical take-off and horizontal flight. Finally, upon completion of pivoting of the tubular wings 18 and 20 to the horizontal positions the aircraft 10 will achieve horizontal flight as indicated by positions C in FIG. 2.

When the aircraft 10 is to land, the tubular wings 18 and 20 are slowly pivoted from the horizontal positions through the transitional inclined positions thereof indicated as at D in FIG. 2 and final movement of the tubular wings 18 and 20 to the upstanding positions, coupled with suitable power output of the propeller assemblies 42, will enable the aircraft 10 to descend to the ground supported position A illustrated in FIG. 2.

It is also to be noted that the tubular wings 18 and 20 may also be at least slightly angularly displaced in a clockwise direction from the positions thereof illustrated in position A in FIG. 2. This of course will enable the aircraft 10 to achieve vertical flight against a "tail wind".

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A VTOL aircraft including a fuselage defining front and rear ends, opposite sides and top and bottom portions, a pair of laterally spaced front-to-rear extending elongated support structures between adjacent sides of which said fuselage is mounted and including front and rear ends which project forward and rearward of said fuselage, a pair of front and rear tubular wings oscillatably supported between the front and rear ends of said support structures for angular displacement about axes extending generally along diametric planes of said tubular wings, said tubular wings including inlet and discharge ends, control means connected between said tubular wings and support structures operative to simultaneously and equally angularly adjust said tubular wings relative to said support structures between upright positions with said inlet ends opening upwardly and horizontal positions with said inlet ends opening forwardly, and motor driven rotor means journalled in said wings for intaking air through said inlet ends and discharging air from said discharge ends, the discharge ends of said tubular wings including axially endwise outwardly projecting landing gear struts mounted from opposite side portions of the discharge ends of said tubular wings, the free ends of said struts including ground-engaging elements, said motor driven rotor means, when said tubular wings are in their upright positions, being disposed in planes spaced appreciably above the center of gravity of the aircraft.

2. The aircraft of claim 1 wherein said motor driven rotor means journalled in said wings comprise motor housings mounted centrally in said wings by generally radial struts extending between said motor housings and inner peripheral portions of said tubular wings, said rotor means being journalled from said housings.

3. The aircraft of claim 2 wherein each of said tubular wings includes three generally radial motor housing supporting struts rearward of the corresponding rotor means including a pair of limited dihedral generally horizontal opposite side struts and a single vertical strut when said tubular wings are horizontally disposed.

4. The aircraft of claim 3 wherein said horizontal struts include generally vertically swingable combined elevator and ailerons and said vertical strut includes a horizontally swingable rudder.

5. The aircraft of claim 2 wherein each of said tubular wings also includes a radial tubular strut extending between the corresponding motor housing and an adjacent inner peripheral portion of a wing section journalled from one of said support structures by a tubular stub axle construction, motor controlling means extending through each of said tubular struts.

6. The aircraft of claim 1 wherein said tubular wings are also angularly displaceable toward upwardly and rearwardly inclined positions when said support structures are horizontally disposed.

7. The aircraft of claim 1 wherein said ground-engaging elements comprise rotatable ground-engaging wheels.

8. The aircraft of claim 1 wherein each of said motor driven rotor means includes variable pitch rotor blades.

9. The aircraft of claim 1 wherein said fuselage is supported between central portions of said elongated support structures by an abbreviated wing construction including opposite side portions thereof extending between opposite sides of said fuselage and the adjacent support structure mid-portions.

* * * * *